(12) United States Patent
Ballard

(10) Patent No.: US 6,422,138 B1
(45) Date of Patent: Jul. 23, 2002

(54) CANNED FOOD PRESSING DEVICE

(76) Inventor: Timothy Ballard, 108-25 72 nd Ave. #6G, Forest Hills, NY (US) 11375

( * ) Notice: Subject to any disclaimer, the term of this patent is extended or adjusted under 35 U.S.C. 154(b) by 231 days.

(21) Appl. No.: 09/616,664

(22) Filed: Jul. 14, 2000

(51) Int. Cl.[7] .............................. A47J 19/06; B30B 7/00
(52) U.S. Cl. ........................ 100/110; 100/116; 100/127; 100/248
(58) Field of Search ................................ 100/110, 116, 100/127, 248

(56) References Cited

U.S. PATENT DOCUMENTS

| | | | | |
|---|---|---|---|---|
| 3,995,544 A | * | 12/1976 | Gray | 100/116 |
| 4,355,574 A | * | 10/1982 | Bond et al. | 100/110 |
| 4,860,647 A | * | 8/1989 | Kerslake | 100/110 |
| 5,320,031 A | * | 6/1994 | Whitney | 100/110 |
| 5,372,063 A | * | 12/1994 | Berg | 100/110 |
| 5,590,590 A | * | 1/1997 | Zammit | 100/110 |
| 6,112,650 A | * | 9/2000 | Mazzaccaro | 100/110 |

* cited by examiner

*Primary Examiner*—Allen Ostrager
*Assistant Examiner*—William Hong
(74) *Attorney, Agent, or Firm*—Goldstein Law Offices, P.C.

(57) ABSTRACT

A canned food pressing device including a cylindrical member having an upper end, a lower end, and a cylindrical side wall therebetween. The cylindrical member has an external diameter slightly less than the internal diameter of a can of tuna fish. The lower end is positionable on the separable lid once separated from the can to facilitate an inward pushing of the lid against the tuna fish. A cylindrical flange member is secured to the cylindrical side wall of the cylindrical member intermediate the upper and lower ends thereof. The cylindrical flange member extends outwardly beyond the external diameter of the cylindrical member to provide a shield for the water and oil drained from the tuna fish.

1 Claim, 2 Drawing Sheets

CANNED FOOD PRESSING DEVICE

BACKGROUND OF THE INVENTION

The present invention relates to canned food pressing device and more particularly pertains to allowing a user to separate water and oil from tuna fish while in its can while preventing incidental splashing.

The use of straining devices is own in the prior art. More specifically, straining devices heretofore devised and utilized for the purpose of removing water from food are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,995,544 to Farley discloses a tuna squeezer and strain utensil comprised of a cup shaped with a cylindrical wall for conforming to the internal diameter of a standard can. U.S. Pat. No. 5,372,063 to Berg and U.S. Pat. No. 5,320,031 to Whitney inclose additional food presses for forcing liquid from a can.

While these devices fulfill their respective, particular objective and requirements, the aforementioned patents do not describe a canned food pressing device for allowing a user to separate water and oil from tuna fish while in its can while preventing incidental splashing.

In this respect, the canned food pressing device according to the present invention substantially departs from the conventional concepts and designs of the prior art, and in doing so provides an apparatus primarily developed for the purpose of allowing a user to separate water and oil from tuna fish while in its can while preventing incidental splashing.

Therefore, it can be appreciated that there exists a continuing need for a new and improved canned food pressing device which can be used for allowing a user to separate water and oil from tuna fish while in its can while preventing incidental splashing. In this regard, the present invention substantially fulfills this need.

SUMMARY OF THE INVENTION

In the view of the foregoing disadvantages inherent in the known types of straining devices now present in the prior art, the present invention provides an improved canned food pressing device. As such, the general purpose of the present invention, which will be described subsequently in greater detail, is to provide a new and improved canned food pressing device which has all the advantages of the prior art and none of the disadvantages.

To attain this, the present invention essentially comprises a cylindrical member having an upper end, a lower end, and a cylindrical side wall therebetween. The cylindrical member has an external diameter slightly less than the internal diameter of the can. The lower end is positionable the separable lid once separated from the can to facilitate a inward pushing of the lid against the tuna fish. A cylindrical flange member is secured to the cylindrical side wall of the cylindrical member intermediate the upper and lower ends thereof. The cylindrical flange member extends outwardly beyond the external diameter of the cylindrical member to provide a shield for the water and oil drained from the tuna fish.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved canned food pressing device which has all the advantages of the prior art straining devices and none of the disadvantages.

It is another object of the present invention to provide a new and improved canned food pressing device which may be easily and efficiently manufactured and marketed.

It is a further object of the present invention to provide a new and improved canned food pressing device which is of durable and reliable construction.

An even further object of the present invention is to provide a new and improved canned food pressing device which is susceptible of a low cost of manufacture with regard to both materials and labor, and which accordingly is then susceptible of low prices of sale to the consuming public, thereby making such a canned food pressing device economically available to the buying public.

Even still another object of the present invention is to provide a new and improved canned food pressing device for allowing a user to separate water and oil from tuna fish while in its can while preventing incidental splashing.

Lastly, it is an object of the present invention to provide a new and improved canned food pressing device including a cylindrical member having an upper end, a lower end, and a cylindrical side wall therebetween. The cylindrical member has an external diameter slightly less than the internal diameter of the can. The lower end is positionable on the separable lid once separated from the can to facilitate an inward pushing of the lid against the tuna fish. A cylindrical flange member is secured to the cylindrical side wall of the cylindrical member intermediate the upper and lower ends thereof. The cylindrical flange member extends outwardly beyond the external diameter of the cylindrical member to provide a shield for the water and oil drained from the tuna fish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 2:
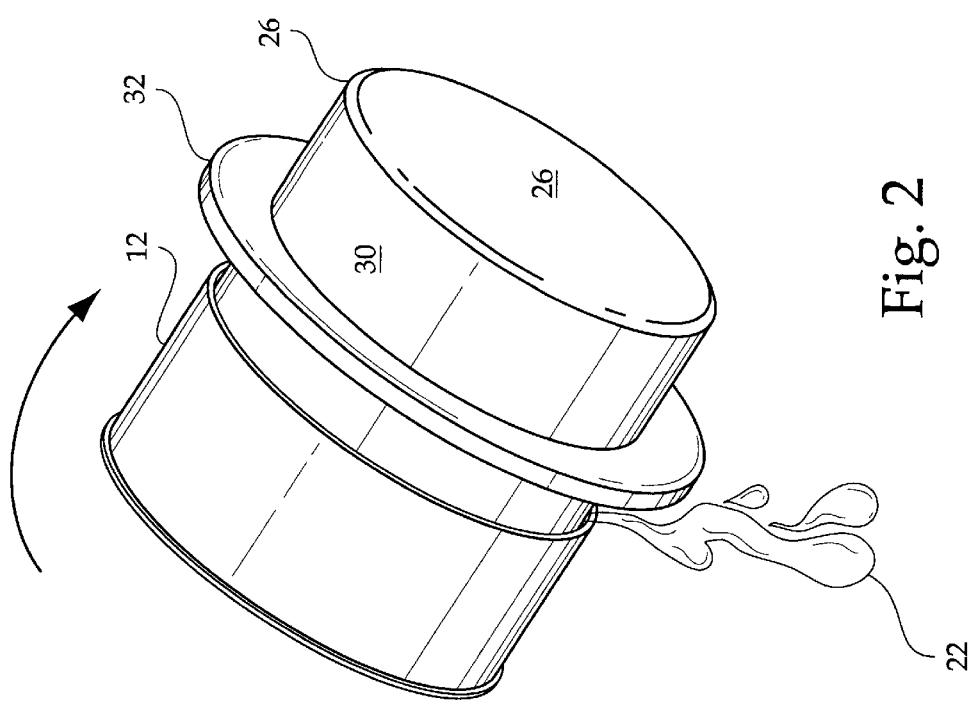
FIG. 2 is a perspective view of the present invention illustrated in use.
Figure 1:
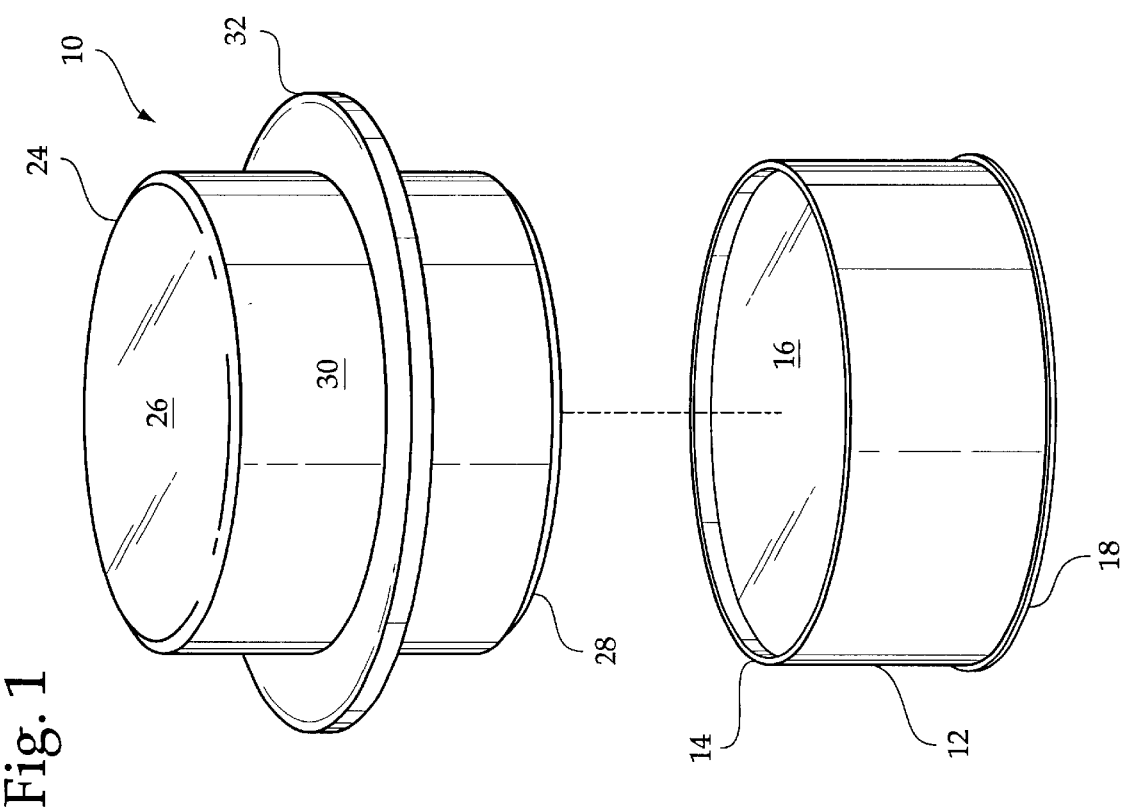
FIG. 1 is a perspective view of the preferred embodiment of the canned food pressing device constructed in accordance with the principles of the present invention.
Figure 3:
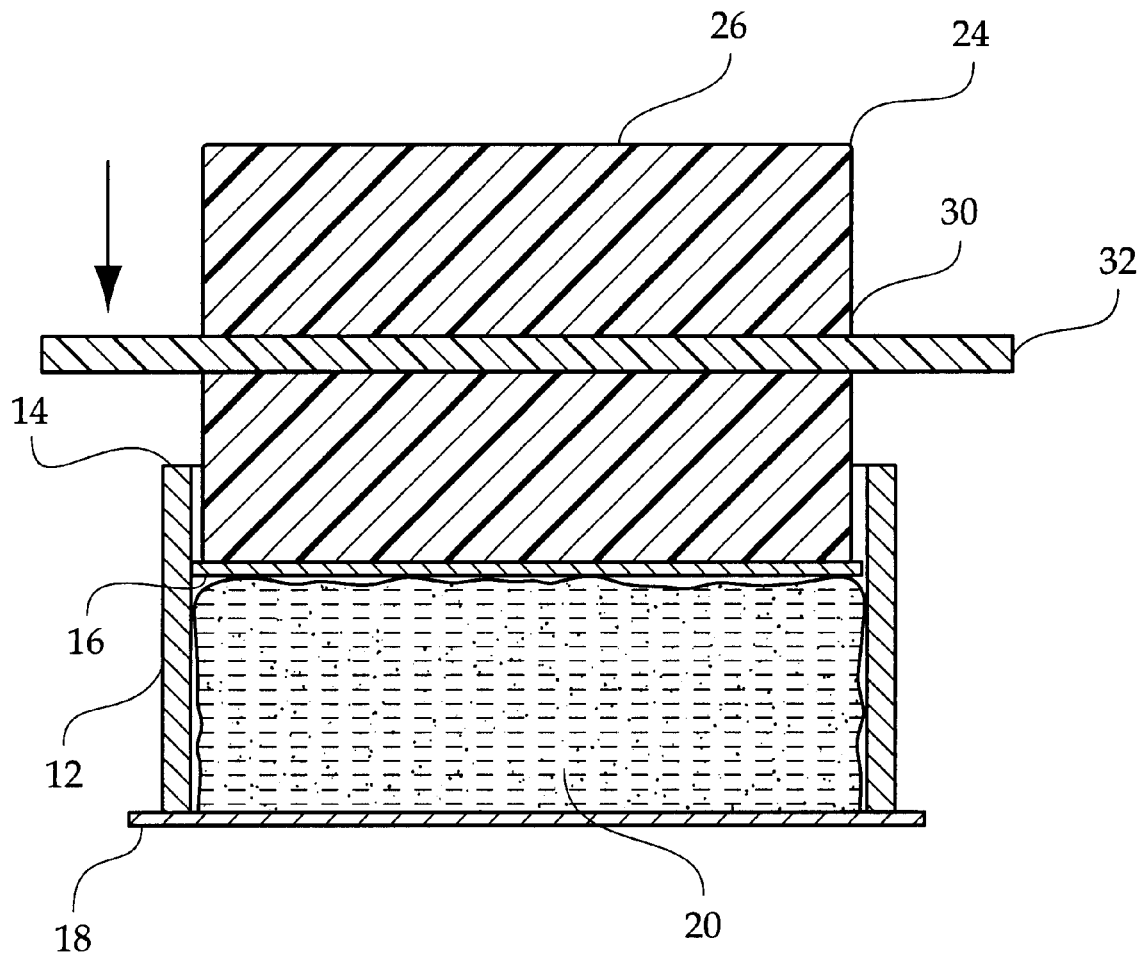
FIG. 3 is a cross-sectional side view of the present invention.

With reference now to the drawings, and in particular, to FIGS. 1 through 3 thereof, the preferred embodiment of the new and improved canned food pressing device embodying the principles and concepts of the present invention and generally designated by the reference number 10 will be described.

Specifically, it will be noted in the various figures that the device relates to a canned food pressing device for allowing a user to separate water and oil from tuna fish while in its can while preventing incidental splashing. In its broadest IBM context, the device consists of a cylindrical member and a cylindrical flange member. Such component are individually configured and correlated with respect to each other so as to attain the desired objective.

The present invention is designed for use on canned food that is packed in oil or water. The present invention was specifically designed for use on canned tuna fish, but can be used on other canned foods packed in water or oil. The tuna fish is packed in a can 12. The can 12 is defined by an openable upper end 14 including a separable lid 16 and a closed lower end 18. The can 12 has an internal diameter for holding a quantity of tuna fish 20 and water or oil 22.

The cylindrical member 24 has an upper end 26, a lower end 28, and a cylindrical side wall 30 therebetween. The cylindrical member 24 has an external diameter slightly less than the internal diameter of the can 12. This will allow the cylindrical member 24 to be positioned within the can 12. Note FIGS. 2 and 3. The lower end 28 is positionable on the separable lid 16 once separated from the can 12 to facilitate an inward pushing of the lid 16 against the tuna fish 20. This inward pushing and concurrent inverting of the can 12 will allow the water or oil 22 to drain from the can 12. Note FIG. 2.

The cylindrical flange member 32 is secured to the cylindrical side wall 30 of the cylindrical member 24 intermediate the upper and lower ends 26,28 thereof. The cylindrical flange member 32 extends outwardly beyond the external diameter of the cylindrical member 24 to provide a shield or the water and oil 22 drained from the tuna fish 20. The flange member 32 will prevent any of the water and oil 22 from being splashed on the user or their clothes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. A canned food pressing device for allowing a user to separate water and oil from tuna fish while in its can while preventing incidental splashing, wherein the can is defined by an openable upper end including a separable lid and a closed lower end, the can has an internal diameter, the device comprising, in combination:

a cylindrical member having an upper end, a lower end, and a cylindrical side wall therebetween, the cylindrical member having an external diameter slightly less than the internal diameter of the can, the lower end being positionable on the separable lid once separated from the can to facilitate an inward pushing of the lid against the tuna fish; and a cylindrical flange member secured to the cylindrical side wall of the cylindrical member intermediate the upper and lower ends thereof, the cylindrical flange member extending outwardly beyond the external diameter of the cylindrical member to provide a shield for the water and oil drained from the tuna fish.

* * * * *